United States Patent
Rapp et al.

(10) Patent No.: US 11,541,848 B2
(45) Date of Patent: Jan. 3, 2023

(54) WIPER ARRANGEMENT

(71) Applicant: Robert Bosch GmbH, Stuttgart (DE)

(72) Inventors: Harald Rapp, Buehl (DE); Raf Greunlinx, Zolder (BE)

(73) Assignee: Robert Bosch GmbH, Stuttgart (DE)

(*) Notice: Subject to any disclaimer, the term of this patent is extended or adjusted under 35 U.S.C. 154(b) by 227 days.

(21) Appl. No.: 16/895,109

(22) Filed: Jun. 8, 2020

(65) Prior Publication Data

US 2020/0384955 A1 Dec. 10, 2020

(30) Foreign Application Priority Data

Jun. 7, 2019 (DE) .......................... 102019208390.0

(51) Int. Cl.
| | | |
|---|---|---|
| *B60S 1/38* | (2006.01) | |
| *B60S 1/34* | (2006.01) | |
| *B60S 1/52* | (2006.01) | |
| *B60S 1/40* | (2006.01) | |

(52) U.S. Cl.
CPC ........... *B60S 1/3862* (2013.01); *B60S 1/3415* (2013.01); *B60S 1/3479* (2013.01); *B60S 1/524* (2013.01); *B60S 1/407* (2013.01)

(58) Field of Classification Search
CPC ........ B60S 1/3415; B60S 1/3862; B60S 1/40; B60S 1/407; B60S 1/4077; B60S 1/524; B60S 1/522; B60S 1/3479; B60S 2001/4061

USPC ....................................................... 15/250.02
See application file for complete search history.

(56) References Cited

U.S. PATENT DOCUMENTS

| | | | | |
|---|---|---|---|---|
| 9,604,600 | B2* | 3/2017 | Izabel ................... | B60S 1/3862 |
| 2013/0291329 | A1* | 11/2013 | Izabel ................... | B60S 1/4048 |
| | | | | 15/250.32 |
| 2014/0196240 | A1 | 7/2014 | Grasso et al. | |
| 2016/0101763 | A1* | 4/2016 | Schaeuble ............. | B60S 1/3415 |
| | | | | 15/250.04 |

FOREIGN PATENT DOCUMENTS

| | | |
|---|---|---|
| DE | 102008049270 A1 | 4/2010 |
| DE | 102010052314 A1 | 5/2012 |
| EP | 3231673 A1 | 10/2017 |
| FR | 3025473 A1 | 3/2016 |
| WO | 2012152545 A1 | 11/2012 |

* cited by examiner

*Primary Examiner* — Gary K. Graham
(74) *Attorney, Agent, or Firm* — Michael Best & Friedrich LLP (57) ABSTRACT

A wiper arrangement having at least one securing and/or guide unit (34*a*; 34*b*; 34*c*), which has at least one securing element (36*a*; 36*b*; 36*c*) with which a connecting unit (24*a*; 24*b*; 24*c*) can be brought into contact when a wiper blade (14*a*; 14*b*; 14*c*) moves relative to a wiper arm (18*a*; 18*b*; 18*c*), and which has at least one guide element (44*a*; 44*b*; 44*c*), which guides the connecting unit (24*a*; 24*b*; 24*c*) when the wiper blade (14*a*; 14*b*; 14*c*) moves relative to the wiper arm (18*a*; 18*b*; 18*c*).

12 Claims, 4 Drawing Sheets

WIPER ARRANGEMENT

BACKGROUND OF THE INVENTION

A wiper arrangement having at least one wiper blade, which has at least one wiper-blade adapter, having at least one wiper arm, which has at least one wiper-arm adapter, having at least one fluid channel, which is arranged on the wiper arm, and having at least one connecting unit for connecting the fluid channel fluidically to the wiper-blade adapter has already been proposed.

SUMMARY OF THE INVENTION

The invention proceeds from a wiper arrangement having at least one wiper blade, which has at least one wiper-blade adapter, having at least one wiper arm, which has at least one wiper-arm adapter, having at least one fluid channel, which is arranged on the wiper arm, and having at least one connecting unit for connecting the fluid channel fluidically to the wiper-blade adapter.

It is proposed that the wiper arrangement should have at least one securing and/or guide unit, which has at least one securing element, in particular a mechanical stop, with which the connecting unit can be brought into contact when the wiper blade moves relative to the wiper arm, and which has at least one guide element, which guides the connecting unit when the wiper blade moves relative to the wiper arm.

The wiper arrangement is preferably designed in the form of part of a wiper. The wiper is preferably designed in the form of a flat-bar wiper. The wiper, in particular the wiper arrangement, is preferably provided for use on a vehicle, in particular on a motor vehicle, in particular for cleaning at least one window of the vehicle. Use on a glass frontage and/or reflective surface of a building, or of some other static object, is also conceivable. The wiper arm is provided, in particular, so that it provides a connection between an object, in particular the vehicle, and the wiper blade in order to guide the wiper blade on a window. It is preferable for the wiper arm to be arranged in captive fashion on the object, in particular the vehicle, and to be mounted in a movable manner on the object. The wiper blade is preferably of interchangeable design. The wiper blade preferably forms a region of contact with the window, in particular of the vehicle. The wiper blade is preferably provided so that it is connected in captive fashion to the wiper arm and/or an adapter of the wiper arm. It is preferable for the wiper-arm adapter to have a region of contact with the wiper arm and to be connected in captive fashion to the wiper arm. The wiper-arm adapter is preferably provided so that it provides a coupling region of the wiper arm for coupling to, and/or establishing contact with, the wiper-blade adapter.

A "fluid channel" is preferably intended to mean a channel-like element for guiding a fluid. In particular, the fluid is provided so that it is dispensed via the wiper blade in order to clean the window. The fluid channel preferably has an at least essentially circular cross section. As an alternative, it is conceivable for the fluid channel to have a polygonal, in particular at least essentially quadratic, cross section, an elliptical cross section or some other cross section which appears to be expedient to a person skilled in the art. The fluid channel is preferably designed in the form of a fluid-directing element, for example a tube and/or in particular a hose, particularly preferably an elastic hose. It is conceivable for the fluid channel to be arranged at least to some extent within a channel-like aperture of the wiper arm and/or to be retained on the wiper arm by holders. A main-extent axis of the fluid channel preferably runs at least essentially parallel to the main-extent axis of the wiper arm. A "main-extent axis" of an object is intended to mean, in particular, an axis which runs parallel to the longest edge of the smallest geometrical cuboid which only just fully encloses the object. "Essentially parallel" should be understood to mean, in particular, an orientation of a direction relative to a refence direction, in particular in a single plane, wherein a deviation of the direction in relation to the reference direction is, in particular, smaller than 8°, advantageously smaller than 5° and particularly advantageously smaller than 2°. The fluid channel is preferably provided for connecting the fluid-accommodating tank of the vehicle to the wiper blade. The fluid channel is preferably provided so that it directs at least one fluid from a fluid-accommodating tank of the wiper to a wiper blade of the wiper, in particular via the connecting unit. The wiper arrangement preferably has at least two, in particular precisely two, fluid channels, which are arranged in particular from the fluid-accommodating tank to the connecting unit, in particular within and/or on the wiper arm. The fluid channel is preferably connected to the connecting unit, in particular at an end of the fluid channel which is directed away from the fluid-accommodating tank. The fluid channel is preferably connected fluidically to the connecting unit, in particular to a connecting element of the connecting unit.

The connecting unit is preferably provided so that it provides a connection, in particular a fluidic one, between the fluid channel and the wiper blade, in particular the wiper-blade adapter. The connecting unit preferably has a curved or L-shaped duct. The duct preferably extends from an end of the connecting unit which is directed toward the fluid channel into the connecting element or into a further end of the connecting unit, which bounds the connecting element and in particular is directed away from the fluid channel. In at least one installed state of the connecting unit, the connecting unit is preferably connected to the wiper-blade adapter. The connecting element of the connecting unit is preferably designed in the form a connector fitting, for example a tube extension, a channel element or the like. It is conceivable for the connecting element to be of at least essentially rigid design. It is also conceivable for the connecting element to be designed in the form of flexible hose and/or a tube and/or to be formed in one piece with the fluid channel. The connecting element is preferably formed at least for the most part, in particular completely, from a plastic, in particular a hard plastic, and/or from a metal. In a configuration of the wiper arrangement in which the connecting element is formed in one piece with the fluid channel, it is also conceivable for the connecting element to be formed from an elastic material, for example rubber. In addition, it is conceivable for the connecting unit to have at least one sealing element, which is arranged in particular on the connecting element and is provided to give a fluidic seal in the connection between the connecting unit and the wiper-blade adapter. The connecting unit preferably has at least one connecting axis which, in particular in at least one installed state of the wiper blade on the wiper arm, is oriented at least essentially perpendicularly to an axis of rotation of the wiper blade and/or to the main-extent axis of the wiper blade or of the wiper arm. "At least essentially perpendicularly" is intended to mean, in particular, an orientation of a direction relative to a reference direction, wherein the direction and the reference direction, in particular as seen in a projection plane, enclose an angle of 90° and the angle has a maximum deviation of, in particular, smaller than 8°, advantageously smaller than 5° and particularly advantageously smaller than 2°. In the mounted state of the wiper blade, the connection axis is preferably oriented at least essentially parallel to a wiper-blade plane which extends at least essentially perpendicularly to the axis of rotation. The wiper-blade adapter is preferably provided so that it provides a coupling region of the wiper blade for coupling to, and/or establishing contact with, the wiper arm, in particular the wiper-arm adapter, and the connecting unit. The movement of the wiper blade relative to the wiper arm about the axis of rotation of the wiper blade particularly preferably takes place in particular for installation or for removal of the wiper blade and/or of the wiper arm. The wiper blade, in particular the wiper-blade adapter, is preferably provided so that, via the movement relative to the wiper arm about the axis of rotation, it is fastened on, or separated from, the wiper arm, in particular the wiper-arm adapter. The wiper-blade adapter preferably has at least one connection element which is designed in a manner corresponding to the connecting unit, in particular the connecting element. The connection element is preferably provided so that it connects the connecting unit, in particular the connecting element and the duct arranged therein, in particular fluidically to a fluid-directing channel of the wiper-blade adapter. In particular, the connecting unit and the wiper-blade adapter, in particular the connection element, are provided so that they are connected to one another in a direction along the connecting axis.

The securing and/or guide unit is preferably provided so that it couples the connecting unit, at least in terms of movement, to the wiper arm and/or the wiper blade. For example, the securing element, designed in particular in the form of a mechanical stop, has at least one contact surface for bringing it into contact with the connecting unit. In particular, the contact surface is oriented at least essentially perpendicularly to the connecting axis. The contact surface is preferably oriented at least essentially parallel to the main-extent axis of the wiper arm or the wiper blade. For example, the securing element is formed at least to some extent from a metal and/or from a plastic. In particular, the securing element is provided so that, when the wiper blade rotates relative to the wiper arm, it separates the connecting unit from the wiper blade, in particular the wiper-blade adapter, connects the connecting unit to the wiper-blade adapter and/or fastens the connecting unit on the wiper-blade adapter. The guide element is preferably arranged on the wiper blade, in particular the wiper-blade adapter, on the wiper arm, in particular the wiper-arm adapter, or on the connecting unit. The guide element is preferably formed in one piece with the wiper-arm adapter, the wiper-blade adapter or a connecting element of the connecting unit. "In one piece" should be understood to mean, in particular, connected at least integrally, for example by a welding process, an adhesive-bonding process, an injection-molding process and/or some other process which appears to be expedient to a person skilled in the art, and/or should be understood to mean, advantageously, formed in a single piece, for example by being produced from a single mold or source and/or by being produced in an injection-molding process involving one or more components and, advantageously, from a single blank. For example, the guide element is designed in the form of a guide track, in particular of a slot guide, of a guide groove, of a guide rail or the like. As an alternative, or in addition, it is conceivable for the guide element to bound an aperture, in particular a form-fit aperture, of the wiper arm, of the wiper blade or of the connecting unit. The guide element is preferably provided so that, during movement in at least one direction oriented at least essentially parallel to a movement plane of the wiper blade, in particular at least essentially parallel to a connecting axis of the connecting unit, it guides the connecting unit on the wiper arm or the wiper blade. In particular, in at least one state of the wiper blade being arranged on the wiper arm, the movement plane of the wiper blade is oriented at least essentially parallel to a main-extent axis of the wiper arm of a main-extent axis of the wipe blade. The movement plane of the wiper blade is preferably oriented at least essentially perpendicularly to the axis of rotation of the wiper blade on the wiper arm. In particular, the axis of rotation is oriented at least essentially perpendicularly to at least one wiper-blade axis which is oriented at least essentially parallel to the main-extent axis of the wiper blade. In the state in which it is arranged on the wiper arm, the wiper blade is preferably mounted on the wiper arm such that it can be rotated about the axis of rotation.

It is conceivable for the wiper arrangement to comprise at least one electronic-connection unit, which is provided so that it connects at least one electronic connection, in particular a cable connection, of the wiper arm to at least one electronic connection, in particular a cable connection, of the wiper blade. The electronic connections are preferably designed in the form of part of an electronic unit, in particular of a wiper-blade heater, of the wiper and/or of the wiper arrangement. The electronic-connection unit preferably comprises at least one electronic-connection element which, in particular in at least one installed state of the wiper blade and/or of the wiper arm, is arranged at least essentially parallel to a main-extent axis of the wiper arm and/or of the wiper blade on the wiper-arm adapter or the wiper-blade adapter. The electronic connections can preferably be connected to the electronic-connection element, and/or separated therefrom, along an axis which is oriented at least essentially parallel to the main-extent axis of the wiper arm.

The configuration of the wiper arrangement according to the invention can provide for advantageously quick and straightforward installation and/or removal of the wiper blade, in particular since the connecting unit can be coupled to movement of the wiper arm or of the wiper blade. It is possible to achieve an advantageously high level of operating convenience, in particular when the wiper blade is being changed over. In particular by means of the securing and/or guide unit, the connecting unit, in particular the fluidic connection between the connecting unit and the wiper-blade adapter, can be separated from the wiper blade by a rotation of the wiper blade, for the purpose of releasing a connection between the wiper blade and the wiper-arm adapter along the axis of rotation of the wiper arm. The guide element can provide for an advantageously straightforward and quick connection between the connecting unit and the wiper-blade adapter. It is advantageously possible to avoid errors in a connection of the connecting unit and/or of the fluid channel to the wiper-blade adapter, as a result of which in particular escape of the fluid, and resulting damage, can be avoided.

It is also proposed that the securing element should be provided so that, when the wiper blade moves relative to the wiper arm, it subjects the connecting unit to a force in at least one direction, in particular at least essentially parallel to a movement direction of the wiper blade relative to the wiper arm. The movement direction of the wiper blade relative to the wiper arm is preferably oriented at least essentially perpendicularly to the axis of rotation of the wiper blade. In a configuration of the wiper arrangement in which the securing element is arranged on the wiper arm, in particular the wiper-arm adapter, the securing element is preferably provided so that it subjects the connecting unit to a force in at least one direction which is oriented away from the wiper arm, in particular the wiper-blade adapter, and is oriented parallel to the movement direction of the wiper blade, in particular in order to separate the connecting unit and the wiper-blade adapter, when the wiper blade moves relative to the wiper arm. The force is preferably in the form of a wiper-arm retaining force, which is directed counter to a force applied to the wiper blade by a user and which is transmitted to the connecting unit, in particular, via the securing element. In an alternative configuration of the wiper arrangement, in which the securing element is arranged on the wiper blade, in particular the wiper-blade adapter, the securing element is preferably provided so that it subjects the connecting unit to a force in at least one direction which is directed toward the wiper arm, in particular the wiper-blade adapter, and is oriented parallel to the movement direction of the wiper blade, in particular in order to secure the connecting unit on the wiper-blade adapter, when the wiper blade moves relative to the wiper arm. The securing element is preferably provided so that it transmits to the connecting unit, in particular via the contact surface, a force applied to the wiper blade by a user. The configuration of the wiper arrangement according to the invention can result in the wiper blade being installed and/or removed advantageously quickly and straightforwardly, in particular since the connecting unit can be coupled to movement of the wiper arm or of the wiper blade. Unintentional damage to the connecting unit, the wiper-blade adapter and/or the fluid channel during removal of the wiper blade can advantageously be at least essentially avoided.

In addition, it is proposed that the securing element should be provided so that, when the wiper blade moves relative to the wiper arm, it secures the connecting unit in a position relative to the wiper arm or the wiper blade. The securing element is preferably provided so that, when the wiper blade moves relative to the wiper arm about the axis of rotation, it secures the connecting unit on the wiper arm, in particular the wiper-arm adapter, or the wiper blade, in particular the wiper-blade adapter. In a configuration of the wiper arrangement in which the connecting unit is secured on the wiper blade via the securing element, it is preferably the case that, in at least one position secured by the securing element, the connecting unit is connected, in particular fluidically, to the wiper-blade adapter, in particular the connection element. In an alternative configuration of the wiper arrangement, in which the connecting unit is secured on the wiper arm via the securing element, it is preferably the case that, in at least one position secured by the securing element, the connecting unit is arranged spaced apart from the wiper-blade adapter, in particular the connection element. The configuration of the wiper arrangement according to the invention can advantageously at least essentially avoid unintentional damage to the connecting unit and/or the fluid channel during removal of the wiper blade. In particular in a configuration of the wiper arrangement in which the securing element secures the connecting unit on the wiper arm, it is advantageously possible at the same time for the connecting unit to be separated from the wiper blade as a result of the wiper blade moving relative to the wiper arm.

It is also proposed that the securing and/or guide unit should have at least one further guide element, which is arranged on the wiper arm or the connecting unit and is provided so that, in particular for a guided movement of the connecting unit on the wiper arm or the wiper blade, it interacts with the guide element and/or the securing element. The further guide element is preferably formed in one piece with the connecting element or the wiper-arm adapter. The further guide element is designed, for example, in the form of a guide pin, of an extension, of a pin or the like. When it interacts with the guide element, the further guide element preferably engages at least to some extent in the guide element. The further guide element and the guide element are particularly preferably provided so that they mount the connecting unit in a floating manner on the wiper blade, in particular the wiper-blade adapter, or the wiper arm, in particular the wiper-arm adapter, wherein in particular the further guide element and the guide element are provided so that they limit movement of the connecting unit along at least one axis. The guide element is preferably designed such that the movement of further guide element along the guide element is limited at least to some extent. In particular in a configuration of the wiper arrangement in which the guide element is designed in the form of a guide groove, of a guide track, of a guide rail or the like, the guide element is designed, preferably in at least one region of the guide element, in the form of a stop and/or boundary and is provided, in particular, so that it limits movement of the further guide element along the guide element at least to some extent. It is conceivable for at least the guide element and/or the further guide element to be designed at least to some extent in the form of a magnet. In a configuration of the wiper arrangement in which the guide element or the further guide element is designed at least to some extent in the form of a magnet, preferably the further guide element or the guide element is formed at least to some extent from a magnetizable material. The guide element designed in the form of a magnet, or the further guide element designed in the form of a magnet, preferably forms a securing element, in particular the aforementioned securing element. The configuration of the wiper arrangement according to the invention can advantageously guide movement of the connecting unit during installation of the wiper blade. It is possible to achieve an advantageously high level of operating convenience during installation of the wiper blade. Incorrect connection of the connecting unit to the wiper-arm adapter can advantageously be at least essentially avoided.

It is also proposed that the securing element should be arranged on the wiper arm or the wiper blade, in particular should be formed in one piece with the wiper arm or the wiper blade, and should accommodate the connecting unit at least to some extent, or should be accommodated by the connecting unit at least to some extent, when the two are brought into contact. The securing element is preferably arranged on the wiper-arm adapter or the wiper-blade adapter. The securing element is particularly preferably formed in one piece with the wiper-arm adapter or the wiper-blade adapter. In at least one installed state of the wiper blade, the securing element preferably encloses the further guide element, which is arranged on the connecting unit, at least to some extent. In the installed state of the wiper blade, the securing element is preferably enclosed by the connecting unit at least to some extent. The configuration of the wiper arrangement according to the invention can provide for advantageously definitive positioning of the connecting unit on the securing element. It is possible to provide for an advantageously secure connection between the securing element and the wiper arm or the wiper blade. As a result, damage to the securing element, in particular due to incorrect operation, during installation and/or removal of the wiper blade can preferably be at least essentially avoided.

In addition, it is proposed that the wiper arm should have at least one covering cap, which is arranged on the wiper-arm adapter and is provided so that, in particular in combination with the securing element and/or the guide element, it retains the connecting unit in a position relative to the wiper arm and/or the wiper blade. In at least one installed state of the wiper arm, the covering cap is preferably fastened on the wiper-arm adapter. The covering cap is preferably provided so that, in at least one installed state of the wiper arm, it secures the connecting unit in a position relative to the wiper arm, in particular by interaction with the securing element and/or the guide element. It is conceivable for the covering cap to have at least one form-fit extension, which is provided so that, in at least one installed state of the wiper arm, it fixes the connecting unit in at least one direction against movement relative to the covering cap. In one configuration of the invention, the securing element and/or the guide element are/is arranged on the covering cap, in particular are/is formed in one piece with the covering cap. The connecting element is preferably arranged on the wiper arm, in particular the wiper-arm adapter, via the covering cap. In an alternative configuration, the covering cap is provided so that it secures the connecting unit together with the securing element in a position relative to the wiper arm, said securing element butting in particular at least to some extent against the guide element, which is arranged on the connecting element. In particular, the connecting element is arranged at least to some extent between the covering cap and the securing element. In the installed state of the wiper arm, the connecting unit preferably butts against the covering cap. The configuration of the wiper arrangement according to the invention can provide for advantageously straightforward and quick removal of the wiper blade, in particular since the connecting unit can already be released at least to some extent from the wiper blade as a result of the covering cap being removed from the wiper-arm adapter.

It is also proposed that the covering cap should be mounted in a movable manner on the wiper arm, in particular the wiper-arm adapter, and should be provided so that it encloses the wiper-arm adapter, the connecting unit and the securing and/or guide unit at least to some extent in at least one operating state. The covering cap is preferably provided so that, in at least one installed state of the wiper arm, it conceals the connecting unit, the wiper-arm adapter and/or the wiper-blade adapter at least to some extent, in particular at least for the most part. In addition, it is conceivable for the covering cap to be provided so that it conceals the electronic-connection unit and/or the electronic connections at least for the most part, in particular at least essentially completely. The covering cap is preferably mounted on the wiper-arm adapter such that it can be rotated, in particular about a fastening axis. The wiper-arm adapter and/or the covering cap are/is designed such that the fastening axis is oriented at least essentially parallel to the main-extent axis of the wiper arm. In particular on an outer side, which, at least in a state of the covering cap being arranged on the connecting unit, is arranged on the covering cap in a direction facing away from the connecting unit, the covering cap preferably has at least one basic shape which can be for example rounded, polygonal or formed in some other way which is pleasing to a user. The configuration of the wiper arrangement according to the invention can ensure advantageously straightforward and quick removal, in particular since the wiper-arm adapter, the wiper-blade adapter and/or the connecting unit can be protected by the covering cap against damage from external influences. It is possible to provide for an advantageously high level of aerodynamics, wherein in particular the wiper arrangement can have an advantageously low level of air resistance when the vehicle is moving. It is advantageously possible to provide for a pleasing outer appearance of the wiper arrangement.

It is also proposed that the securing and/or guide unit should have at least one actuating element, which is provided so that it separates the connecting unit from the wiper arm or the wiper blade, in particular from the securing element. The actuating element is preferably provided so that it interacts with the securing element in a form-fitting and/or force-fitting manner in order for the connecting unit to be separated from the wiper arm or the wiper blade. The actuating element is preferably arranged on the connecting unit, in particular the connecting element, or the wiper-arm adapter, in particular the covering cap. It is conceivable for the actuating element to be of elastic design at least to some extent, wherein in particular deformation of the actuating element, in particular by a user, causes release of a force-fitting and/or form-fitting connection between the connecting unit, in particular the connecting element, and the securing element. As an alternative, it is conceivable for the actuating element to be of wedge-shaped design in at least one region, wherein in particular actuation by a user brings the actuating element into contact with the securing element, and in particular separation of contact surfaces of the securing element and of the connecting unit cause release of the force-fitting and/or form-fitting connection between the connecting unit, in particular the connecting element, and the securing element. The actuating element is preferably arranged in a movable manner on the connecting element or formed in one piece with the connecting element. The actuating element preferably has at least one actuating surface, which is arranged in particular on a side of the actuating element, and/or of the connecting unit, which is directed away from the wiper-blade adapter. The actuating surface is preferably arranged on a side of the actuating element, and/or of the connecting unit, in particular of the connecting element, which is oriented at least essentially perpendicularly to the connecting axis. As an alternative, or in addition, it is conceivable for the securing and/or guide unit to have at least one actuating element which is designed in the form of a button and is provided so that actuation by a user releases the connecting unit at least to some extent from the securing element. The configuration of the wiper arrangement according to the invention can provide for advantageously straightforward and quick removal of the wiper blade.

In addition, it is proposed that the securing element should be designed at least to some extent in the form of a latching element and should be provided so that it fastens the connecting unit, in at least one connected state, on the wiper-blade adapter. The securing and/or guide unit preferably has at least one mating securing element, which is arranged on the wiper-blade adapter and is provided so that it interacts with the securing element, designed in the form of a latching element, in order for the connecting unit to be fastened on the wiper-blade adapter. The securing element is preferably provided so that it latches in on the mating securing element in order for the connecting unit to be fastened on the wiper-blade adapter, in particular in order for a form-fitting and/or force-fitting connection to be established. The mating securing element has at least one abutment surface, against which, in at least one fastened state of the connecting unit, the securing element butts at least to some extent against the mating securing element. The securing element and/or the mating securing element are/is particularly preferably designed such that, when the wiper blade moves relative to the wiper arm, the connecting unit, in particular the connecting element is subjected to a retaining force in at least one direction which is oriented at least essentially perpendicularly to an axis which is oriented at least essentially parallel to the main-extent axis of the wiper blade. In a preferred configuration of the invention, the securing and/or guide unit has at least two, in particular precisely two, securing elements designed in the form of latching elements and at least two, in particular precisely two, mating securing elements, which, as seen along the main-extent axis of the wiper blade, are arranged in each case on one side of the connecting element and/or of the wiper-blade adapter. The two securing elements are preferably arranged and/or designed such that the securing elements engage at least to some extent around the mating securing elements in opposite directions in each case. In particular, the actuating element is provided so that when actuated, in particular by a user, it releases the two securing elements from the two mating securing elements, in particular the form-fitting and/or force-fitting connection of the connecting element and of the wiper-blade adapter. The configuration of the wiper arrangement according to the invention can provide for advantageously reliable installation and/or removal of the wiper blade, in particular since the connecting unit can be fastened on the wiper-blade adapter independently of a movement of the wiper blade relative to the wiper arm. Unintentional escape of fluids during installation and/or removal of the wiper blade can advantageously be at least essentially avoided. Incorrect installation of the connecting unit on the wiper-blade adapter can advantageously be avoided, in particular since a successful connection can be signaled to a user by virtue of the securing element latching in.

A wiper having at least one wiper arrangement according to the invention, in particular the aforementioned wiper arrangement, is proposed as well. The wiper-blade adapter preferably has at least one retaining element, which is provided in order to fasten the wiper-blade adapter on the wiper blade. The wiper-blade adapter preferably comprises at least one fluid-directing channel in order to direct the fluid from the connection element to the wiper blade and/or to at least one fluid-dispensing element of the wiper-blade adapter. The fluid-dispensing element is preferably designed, for example, in the form of a nozzle. In particular, the fluid-dispensing element is formed in one piece with the fluid-directing channel and/or the wiper-blade adapter. The wiper blade and/or the nozzle element are/is preferably provided so as to dispense the fluid in order for the window to be cleaned. The fluid-directing channel preferably comprises at least two extensions at least in order to connect the wiper-blade adapter fluidically to the wiper blade, said extensions being arranged on the wiper-blade adapter in particular at least essentially parallel to a main-extent axis of the wiper blade. The wiper arm, in particular the wiper-arm adapter, and the wiper-blade adapter are preferably connected to one another such that they can be rotated via at least one bearing bolt of the wiper-arm adapter. In particular, the bearing bolt extends at least essentially parallel to the axis of rotation of the wiper blade. A longitudinal axis of the bearing bolt is preferably identical to the axis of rotation of the wiper blade. The wiper arm, in particular the wiper-arm adapter, preferably has at least one fastening element, which is provided so that it retains the wiper blade in at least one position relative to the wiper arm. In particular, the fastening element is designed, for example, in the form of a clamping element, of a spring element or the like. The wiper-blade adapter preferably has at least one at least to some extent tubular aperture for accommodating the bearing bolt. The wiper-blade adapter preferably has at least one further fastening element, which is designed in particular in a manner corresponding to the fastening element of the wiper arm, in particular of the wiper-arm adapter. However, it is also conceivable to have other configurations of the wiper arm, in particular of the wiper-arm adapter, and/or the wiper-blade adapter in order to fasten the wiper blade on the wiper arm. It is conceivable for the wiper to comprise the electronic unit. The wiper and/or the vehicle preferably have/has at least one control and/or regulating unit, which is provided in order to control and/or regulate the wiper arm and the electronic unit. The configuration of the wiper according to the invention can provide for advantageously quick and straightforward installation and/or removal of the wiper blade.

The wiper arrangement according to the invention and/or the wiper according to the invention are/is not intended to be restricted here to the use and embodiment described above. In particular, in order to perform a function described herein, the wiper arrangement according to the invention and/or the wiper according to the invention can have a number of individual elements, components and units which differs from a number mentioned herein. In addition, in the case of the value ranges specified in this disclosure, the intention is also for values lying within the stated limits to count as being disclosed and usable in any desired way.

BRIEF DESCRIPTION OF THE DRAWINGS

Further advantages can be gathered from the following description of the drawing. The drawing illustrates three exemplary embodiments of the invention. The drawing, the description and the claims contain numerous features in combination. A person skilled in the art will expediently also consider the features individually and combine them to form advantageous further combinations.

In the drawings.

DETAILED DESCRIPTION

Figure 1:
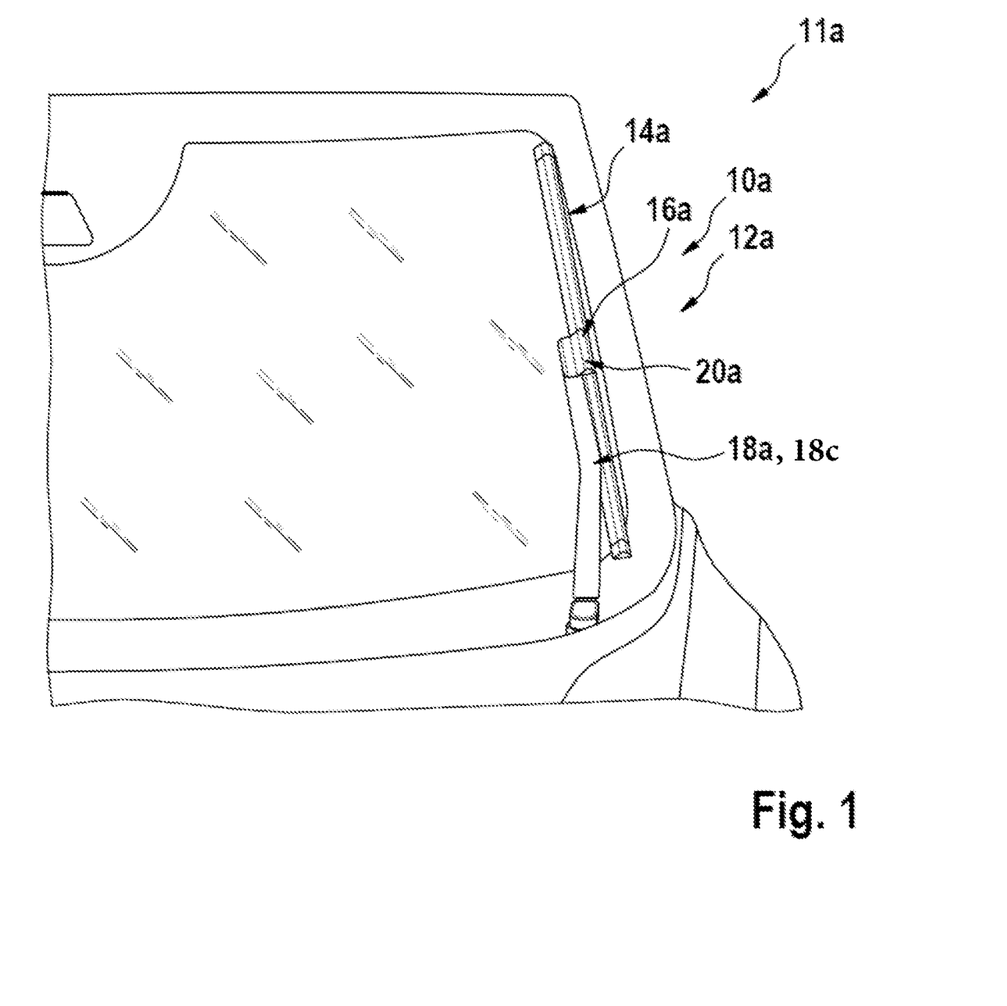
FIG. 1 shows a schematic illustration of a wiper according to the invention having a wiper arrangement according to the invention, a state installed on a vehicle.

FIG. 1 shows a wiper 10a as part of a motor vehicle 11a. The motor vehicle 11a has a window, in particular a front windshield, wherein the wiper 10a is provided in order to clean the window. However, it is also conceivable for the wiper 10a to be provided in order to clean some other window of the motor vehicle 11a. The wiper 10a comprises a wiper arrangement 12a having a wiper blade 14a, which has a wiper-blade adapter 16a, and having a wiper arm 18a, which has a wiper-arm adapter 20a. The wiper arrangement 12a is mounted in a rotatable manner on an outer periphery of the window, in particular via the wiper arm 18a. The wiper arm 18a is arranged in captive fashion on the motor vehicle 11a. The wiper blade 14a has a region of contact with the window. The wiper blade 14a is preferably provided in order to be connected to the wiper arm 18a and/or the wiper-arm adapter 20a of the wiper arm 18a. The wiper-arm adapter 20a has a region of contact with the wiper arm 18a and is connected to the wiper arm 18a. The wiper-arm adapter 20a is preferably provided so that it gives a coupling region of the wiper arm 18a for coupling to, and/or establishing contact with, the wiper-blade adapter 16a.

Figure 2:
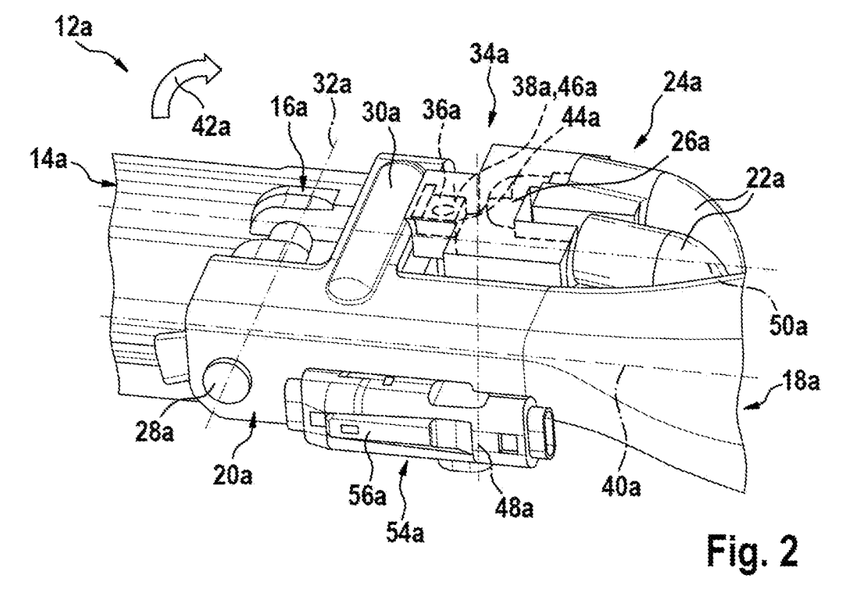
FIG. 2 shows a schematic illustration of the wiper arrangement according to the invention in a detail-specific view of a connecting region of a wiper blade and of a wiper arm of the wiper arrangement according to the invention, in an installed state.

FIG. 2 shows a detail-specific view of the wiper arrangement 12a in a connecting region of the wiper blade 14a and of the wiper arm 18a. The wiper arrangement 12a has two fluid channels 22a, which are arranged on the wiper arm 18a. The wiper arrangement 12a has a connecting unit 24a for connecting the fluid channels 22a fluidically to the wiper-blade adapter 16a. The wiper-blade adapter 16a has a connection element 72a for fluidic connection to the connecting region 24a, said connection element nevertheless not being shown in FIG. 2. The connecting unit 24a comprises a connecting element 26a, which comprises two fluid-directing channels, which are formed separately from one another in terms of fluid flow and are not shown, in particular, in FIG. 2. The two fluid channels 22a are connected to the connecting element 26a, in particular the fluid-directing channels, of the connecting unit 24a. The wiper arm 18a is connected in a rotatable manner to the wiper blade 14a, in particular the wiper-blade adapter 16a, via the wiper-arm adapter 20a and a bearing bolt 28a of the wiper-arm adapter 20a. The bearing bolt 28a extends at least essentially parallel to an axis of rotation 32a of the wiper blade 14a, wherein in particular a longitudinal axis of the bearing bolt 28a is arranged in a manner identical to the axis of rotation 32a of the wiper blade 14a. The wiper-arm adapter 20a has a fastening element 30a, which is provided so that it retains the wiper blade 14a in at least one position relative to the wiper arm 18a. The fastening element 30a is designed in the form of a clamping element. However, other configurations of the connecting unit 24a and/or of the fastening element 30a are also conceivable. The wiper arrangement 12a comprises a securing and/or guide unit 34a, which has a securing element 36a, which is designed in the form of a mechanical stop and with which the connecting unit 24a can be brought into contact when the wiper blade 14a moves relative to the wiper arm 18a, in particular about the axis of rotation 32a. The securing element 36a is provided so that it accommodates the connecting unit 24a at least to some extent when the two are brought into contact. The securing element 36a, which is designed in the form of a mechanical stop, has a contact surface 38a for coming into contact with the connecting unit 24a. The contact surface 38a of the securing element 36a is oriented at least essentially parallel to a main-extent axis 40a of the wiper arm 18a. The securing element 36a is provided so that, when the wiper blade 14a moves relative to the wipe arm 18a, it subjects the connecting unit 24a, in particular the connecting element 26a, to a force in at least one direction, in particular at least essentially parallel to a movement direction 42a of the wiper blade 14a relative to the wiper arm 18a, which is oriented in particular about the axis of rotation 32a. The securing element 36a is preferably provided so that it subjects the connecting unit 24a, in particular the connecting element 26a, to a force in at least one direction which is oriented away from the wiper arm 18a, in particular the wiper-blade adapter 16a, and is oriented parallel to the movement direction 42a of the wiper blade 14a, in particular in order to separate the connecting unit 24a, in particular the connecting element 26a, and the wiper-blade adapter 16a, when the wiper blade 14a moves relative to the wiper arm 18a. The securing element 36a is provided so that, when the wiper blade 14a moves relative to the wiper arm 18a, it secures the connecting unit 24a, in particular the connecting element 26a, in a position relative to the wiper arm 18a. In a position secured by the securing element 36a, said position being shown in FIG. 2, the connecting unit 24a, in particular the connecting element 26a, is connected, in particular fluidically, to the wiper-blade adapter 16a on the wiper blade 14a. The securing element 36a is arranged on the wiper arm 18a, in particular the wiper-arm adapter 20a, and is formed in one piece with the wiper arm 18a. The securing element 36a is designed in the form of an extension on the fastening element 30a of the wiper arm 18a. The securing element 36a extends from the fastening element 30a at least for the most part along an axis of the wiper-arm adapter 20a which is oriented at least essentially parallel to the main-extent axis 40a of the wiper arm 18a. The securing element 36a is provided so that it accommodates the connecting unit 24a at least in part when the two are brought into contact. The securing and/or guide unit 34a has a guide element 44a, which is arranged on the connecting element 26a and guides the connecting unit 24a when the wiper blade 14a moves relative to the wiper arm 18a. The guide element 44a is formed in one piece with the connecting element 26a of the connecting unit 24a. The guide element 44a is designed in the form of an aperture. In a direction which is oriented away from the wiper-blade adapter 16a, the guide element 44a has, on the connecting element 26a, a contact surface 46a for coming into contact with the securing element 36a, in particular the contact surface 38a of the securing element 36a. The guide element 44a is arranged on the connecting element 26a at least to some extent along a direction which is oriented at least essentially parallel to a connecting axis 48a of the connecting unit 24a. The guide element 44a is provided so that it guides the connecting unit 24a on the wiper arm 18a in a movement in at least one direction which is oriented at least essentially parallel to a movement plane of the wiper blade 14a, in particular at least essentially parallel to the connecting axis 48a of the connecting unit 24a. The movement plane of the wiper blade 14a is oriented at least essentially perpendicularly to the axis of rotation 32a of the wiper blade 14a on the wiper arm 18a. In particular, the axis of rotation 32a is oriented at least essentially perpendicularly to a main-extent axis 50a of the wiper blade 14a. The securing element 36a of the securing and/or guide unit 34a forms a further guide element 52a, which is arranged on the wiper arm 18a and is provided so that, in particular for a guided movement of the connecting unit 24a on the wiper arm 18a, it interacts with the guide element 44a. The further guide element 52a, which is formed in particular by the securing element 36a, is provided so that, when it interacts with the guide element 44a, it is enclosed at least to some extent by the guide element 44a. The further guide element 52a, which is formed in particular by the securing element 36a, and the guide element 44a are provided so that they mount the connecting unit 24a in a floating manner on the wiper arm 18a, in particular the wiper-arm adapter 20a. The guide element 44a is designed such that movement of the further guide element 52a along the guide element 44a is limited. The wiper arrangement 12a comprises an electronic-connection unit 54a, which is provided so that it connects at least one electronic connection, in particular a cable connection, of the wiper arm 18a to at least one electronic connection, in particular a cable connection, of the wiper blade 14a, wherein in particular the electronic connections of the wiper arm 18a and of the wiper blade 14a are not shown in FIG. 2. The electronic-connection unit 54a and the electronic connections are designed in the form of part of an electronic unit, in particular of a wiper-blade heater, of the wiper 10a. The electronic-connection unit 54a comprises an electronic-connection element 56a which, in particular in the installed state of the wiper blade 14a and of the wiper arm 18a which is shown in FIG. 2, is arranged on the wiper-arm adapter 20a at least essentially parallel to the main-extent axes 40a, 50a of the wiper arm 18a and of the wiper blade 14a.

Figure 3:
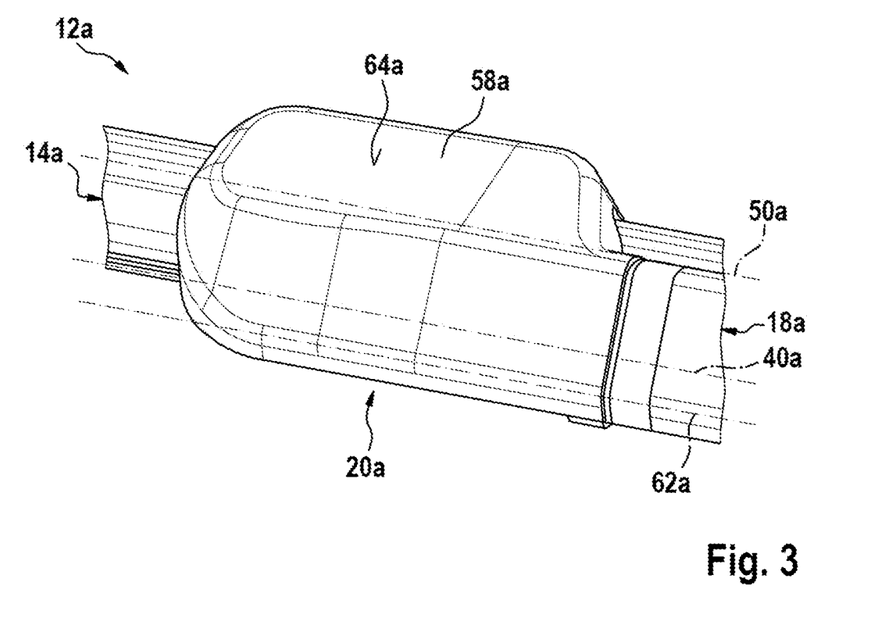
FIG. 3 shows a schematic illustration of the wiper arrangement according to the invention in a detail-specific view of the connecting region of the wiper blade and of the wiper arm, in an installed state, with a covering cap.

FIG. 3 shows the wiper arrangement 12a in the region of the wiper-blade adapter 16a in a detail including a covering cap 58a of the wiper arm 18a, in an installed state. The covering cap 58a is arranged on the wiper-arm adapter 20a and is provided so that, in combination with the securing element 36a and the guide element 44a, it retains the connecting unit 24a, in particular the connecting element 26a, in a position relative to the wiper arm 18a and/or the wiper blade 14a. In at least one installed state of the wiper arm 18a, in particular the state which is shown in FIG. 3, the covering cap 58a is fastened on the wiper-arm adapter 20a. The covering cap 58a is provided so that, in the installed state of the wiper arm 18a, it secures the connecting unit 24a, in particular the connecting element 26a, in a position relative to the wiper arm 18a by interaction with the securing element 36a and the guide element 44a. The covering cap 58a has a form-fit extension 60a, which is not shown in FIG. 3 and is provided so that, in the installed state of the wiper arm 18a, it fixes the connecting unit 24a, in particular the connecting element 26a, in at least one direction against movement relative to the covering cap 58a and to the wiper arm 18a. The covering cap 58a is provided so that it secures the connecting unit 24a, in particular the connecting element 26a, together with the securing element 36a in a position relative to the wiper arm 18a, said securing element butting, in particular via the contact surfaces 38a, 46a, at least to some extent against the guide element 44a, which is arranged on the connecting element 26a. In particular, the connecting element 26a is arranged at least to some extent between the covering cap 58a and the securing element 36a. In the installed state of the wiper arm 18a, the connecting unit 24a butts against the covering cap 58a. The covering cap 58a is mounted in a movable manner on the wiper arm 18a, in particular the wiper-arm adapter 20a, and is provided so that it encloses the wiper-arm adapter 20a, the connecting unit 24a and the securing and/or guide unit 34a at least to some extent in at least one operating state. The covering cap 58a is provided so that, in the installed state of the wiper arm 18a, it conceals the connecting unit 24a, in particular the connecting element 26a, the wiper-arm adapter 20a, the electronic-connection unit 54a and the wiper-blade adapter 16a at least to some extent, in particular at least for the most part. The covering cap 58a is mounted on the wiper-arm adapter 20a such that it can be rotated about a fastening axis 62a. The wiper-arm adapter 20a and the covering cap 58a are designed such that the fastening axis 62a is oriented at least essentially parallel to the main-extent axis 40a of the wiper arm 18a. On an outer side 64a, which, at least in a state of the covering cap 58a being arranged on the connecting unit 24a, is arranged on the covering cap 58a in a direction facing away from the connecting unit 24a, the covering cap 58a has at least one rounded basic shape. However, other configurations of the covering cap 58a are also conceivable.

FIGS. 4 to 7 show two further exemplary embodiments of the invention. The following descriptions and the drawings are restricted essentially to the differences between the exemplary embodiments, wherein, as far as identically denoted components, in particular components with identical reference signs, are concerned, reference can also be made, in principle, to the drawings and/or the description relating to the other exemplary embodiments, in particular of FIGS. 1 to 3. In order to distinguish the exemplary embodiments, the reference signs of the exemplary embodiment in FIGS. 1 to 3 are followed by the letter a. In the exemplary embodiments of FIGS. 4 to 7, the letter a has been replaced by the letters b and c, respectively.

Figure 4:
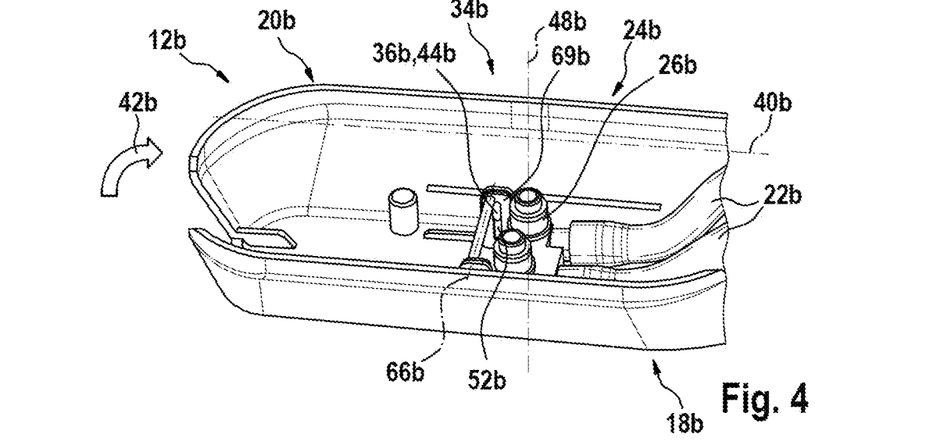
FIG. 4 shows a schematic illustration of a covering cap, of a connecting unit and of a securing and/or guide unit of an alternative configuration of a wiper arrangement according to the invention.
Figure 5:
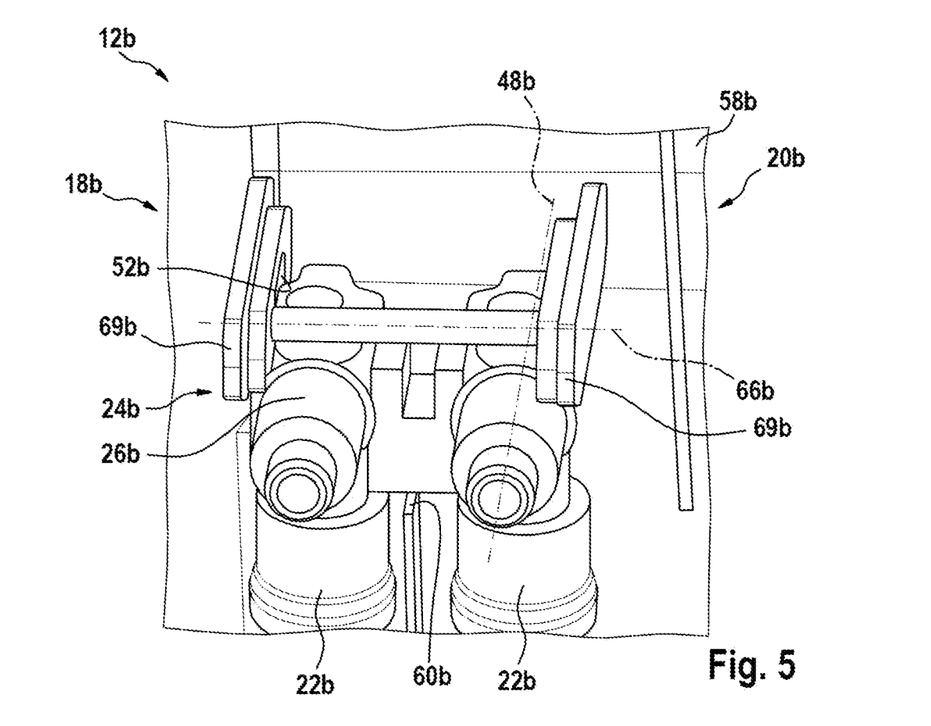
FIG. 5 shows an alternative schematic illustration of the covering cap, of the connecting unit and of the securing and/or guide unit of the alternative configuration of the wiper arrangement according to the invention.

FIGS. 4 and 5 each show a detail of an alternative configuration of an arrangement 12b of a wiper 10b. The wiper arrangement 12b comprises a wiper blade, which has at least one wiper-blade adapter, a wiper arm 18b, which has at least one wiper-arm adapter 20b, two fluid channels 22b, which are arranged on the wiper arm 18b, and a connecting unit 24b for connecting the fluid channels 22b fluidically to the wiper-blade adapter. FIGS. 4 and 5 show merely the connecting unit 24b, a securing and/or guide unit 34b of the wiper arrangement 12b and also parts of the wiper-arm adapter 20b and of the fluid channels 22b. The wiper arrangement 12b, which is illustrated in FIGS. 4 and 5, has a configuration which is at least essentially analogous to that of the wiper arrangement 12a, which is described in the description relating to FIGS. 1 to 3, and therefore, in respect of a configuration of the wiper arrangement 12b, which is illustrated in FIGS. 4 and 5, reference can be made at least essentially to the description relating to FIGS. 1 to 3. In contrast to the wiper arrangement 12a, which is described in the description relating to FIGS. 1 to 3, the wiper arrangement 12b, which is illustrated in FIGS. 4 and 5, preferably has the securing and/or guide unit 34b, which is connected at least to some extent to a covering cap 58b of the wiper arm 18b. The connecting element 26b is arranged on the wiper arm 18b, in particular the wiper-arm adapter 20b, via the covering cap 58b. The securing and/or guide unit 34b has two securing elements 36b, which are designed at least to some extent in the form of a mechanical stop and with which the connecting unit 24b can be brought into contact when the wiper blade moves relative to the wiper arm 18b. The securing and/or guide unit 34b has two guide elements 44b, which guide the connecting unit 24b when the wiper blade moves relative to the wiper arm 18b. The securing elements 36b and the guide elements 44b are formed in one piece with the covering cap 58b. The securing elements 36b, the guide elements 44b and two further guide elements 52b of the securing and/or guide unit 34b, said further guide elements being arranged on the connecting element 26b and being designed in the form of a guide groove, are designed together in the form of a slot guide, wherein in particular the connecting unit 24b, in particular a connecting element 26b of the connecting unit 24b, is mounted in a movable, in particular floating, manner on the covering cap 58b via the two further guide elements 52b of the securing and/or guide unit 34b. The securing elements 36b each comprise a contact surface 38b, said contact surfaces being designed in the form of surfaces which surround the slot guide. The connecting unit 24b is mounted on the covering cap 58b, for movement along the connecting axis 48b of the connecting unit 24b, via the securing elements 36b and the guide elements 44b. A bearing axis 66b is arranged at least essentially perpendicularly to an axis of the connecting unit 24b which is oriented at least essentially parallel to a connecting axis 48b of the connecting unit 24b. The connecting unit 24b is mounted on the covering cap 58b, along an axis which is oriented at least essentially parallel to the connecting axis 48b, via the securing elements 36b and the guide elements 44b. The guide element 44b is designed such that movement of the connecting unit 26b along the guide element 44b, in particular along the connecting axis 48b, is limited. The covering cap 58b comprises a form-fit extension 60b, which is provided so that, in at least one installed state of the wiper arm 18b, it fixes the connecting unit 24b, in particular the connecting element 26b, in at least one direction against movement relative to the covering cap 58b. The covering cap 58b comprises two extensions 69b, which are arranged on a side of the covering cap 58b which is directed toward the securing and/or guide unit 34b and the connecting unit 24b. The extensions 69b are each formed together with one of the securing elements 36b and one of the guide elements 44b. The extensions 69b are of elastic design at least to some extent, wherein in particular deformation of the extensions 69b, in particular by a user, causes release of a force-fitting and/or form-fitting connection between the connecting unit 24b and the securing elements 36b. The extensions 69b are provided so that, as a result of deformation by the user in opposite directions in each case, they release the force-fitting and/or form-fitting connection between the connecting unit 24b and the securing elements 36b, wherein in particular the connecting unit 24b can be separated from the covering cap 58b. However, other configurations of the connecting unit 24b, of the securing and/or guide unit 34b and/or of the covering cap 58b are also conceivable.

Figure 6:
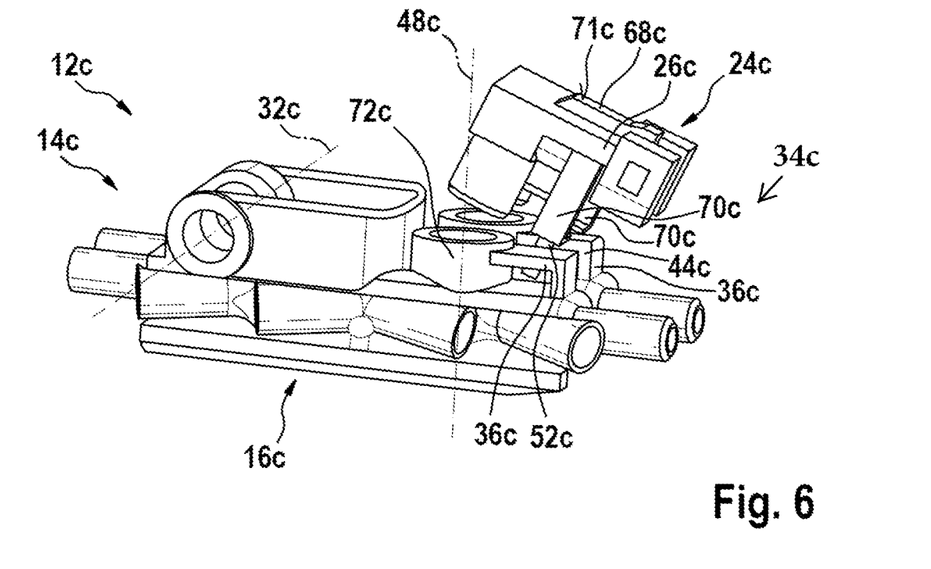
FIG. 6 shows a schematic illustration of a wiper-blade adapter, of a connecting unit and of a securing and/or guide unit of a further alternative configuration of a wiper arrangement according to the invention, the connecting unit not being in an uninstalled state.
Figure 7:
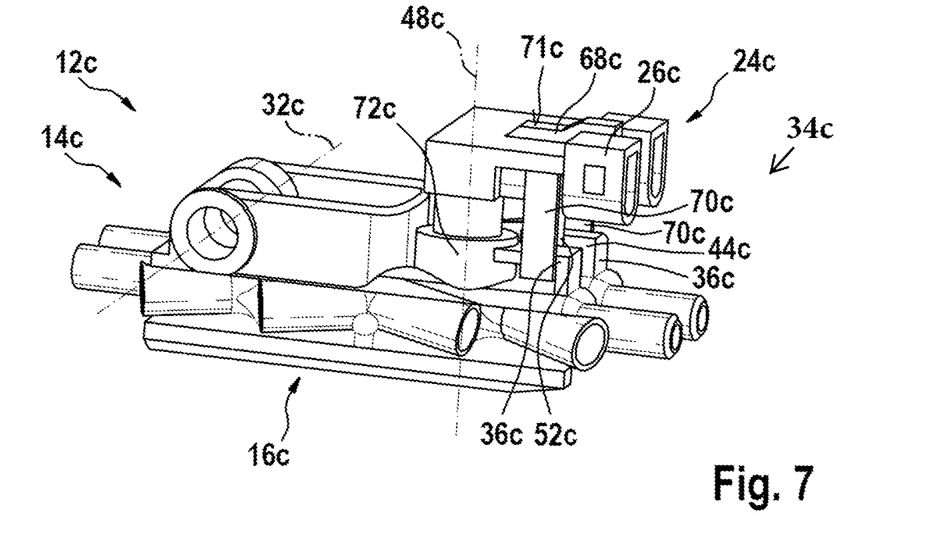
FIG. 7 shows a schematic illustration of the wiper-blade adapter, of the connecting unit and of the securing and/or guide unit of the further alternative configuration of the wiper arrangement according to the invention, the connecting unit being in an installed state.

FIGS. 6 and 7 show a detail of a further alternative configuration of an arrangement 12c of a wiper 10c. The wiper arrangement 12c comprises a wiper blade 14c, which is has at least one wiper-blade adapter 16c, a wiper arm 18c, which has at least one wiper-arm adapter 20c, two fluid channels 22c, which are arranged on the wiper arm 18c, and a connecting unit 24c for connecting the fluid channels 22c fluidically to the wiper-blade adapter 16c. FIGS. 6 and 7 show merely the connecting unit 24c, in particular a connecting element 26c of the connecting unit 24c, a securing and/or guide unit 34c of the wiper arrangement 12c and also the wiper-blade adapter 16c. FIG. 6 shows the connecting unit 24c during a connecting operation, in a state in which it is separated from the wiper-blade adapter 16c in terms of fluid flow, wherein the connecting unit 24c is arranged to some extent on the wiper-blade adapter 16c. FIG. 7 shows the connecting unit 24c in a state in which it is connected to the wiper-blade adapter 16c, wherein in particular the connecting unit 24c is fastened on the wiper-blade adapter 16c. The wiper arrangement 12c, which is illustrated in FIGS. 6 and 7, has a configuration which is at least essentially analogous to that of the wiper arrangement 12a, which is described in the description relating to FIGS. 1 to 3, and therefore, in respect of a configuration of the wiper arrangement 12c, which is illustrated in FIGS. 6 and 7, reference can be made at least essentially to the description relating to FIGS. 1 to 3. In contrast to the wiper arrangement 12a, which is described in the description relating to FIGS. 1 to 3, the wiper arrangement 12c, which is illustrated in FIGS. 6 and 7, preferably has the securing and/or guide unit 34c, which is arranged at least to some extent on the wiper-blade adapter 16c. The securing and/or guide unit 34c has two securing elements 36c, which are designed at least to some extent in the form of mechanical stops and are formed in one piece with the wiper-blade adapter 20c. The connecting unit 24c can be brought into contact with the securing elements 36c. The securing elements 36c are designed at least to some extent in the form of latching elements and are provided so that, in particular via interaction with two mating securing elements 70c of the connecting unit 24c, they fasten the connecting unit 24c, in at least one connected state, on the wiper-blade adapter 16c. The mating securing elements 70c are arranged on the connecting element 26c and are designed, in particular, in the form of latching elements, which are designed at least to some extent in a manner corresponding to the securing elements 36c. The securing elements 36c and the mating securing elements 70c are preferably provided so that, when the connecting element 26c moves relative to the wiper-blade adapter 16c, in particular along a connecting axis 48c of the connecting unit 24c, they engage one inside the other in order for the connecting unit 24c to be connected to the wiper-blade adapter 16c. The securing elements 36c are provided so that, when the wiper blade 14c moves relative to the wiper arm 18c, they subject the connecting unit 24c to a force in at least one direction, in particular at least essentially parallel to a movement direction 42c of the wiper blade 14c relative to the wiper arm 18c. The securing elements 36c are provided so that, when the wiper blade 14c moves relative to the wiper arm 18c, they secure the connecting unit 24c in a position relative to the wiper blade 14c. The securing elements 36c are provided so that they accommodate the connecting unit 24c at least to some extent when the two are brought into contact. The securing and/or guide unit 34c has an actuating element 68c, which is provided so that it separates the connecting unit 24c, in particular the mating securing elements 70c, which are arranged on the connecting element 26c, from the wiper blade 14c, in particular from the securing elements 36c. The actuating element 68c is provided so that it interacts with the securing element 36c in a form-fitting and/or force-fitting manner in order for the connecting unit 24c to be separated from the wiper blade 14c. The actuating element 68c is of elastic design in at least in one region and is provided so that, when actuated by a user, it moves the mating securing elements 70c apart from one another, in opposite directions, transversely to the connecting axis 48c and releases the force-fitting and/or form-fitting connection between the mating securing elements 70c and the securing elements 36c, wherein in particular the connecting unit 24c can be separated from the wiper-blade adapter 16c. The actuating element 68c is arranged in a movable manner on the connecting element 26c. The actuating element 68c has an actuating surface 71c, which is arranged on the connecting element 26c on a side of the connecting unit 24c which is directed away from the wiper-blade adapter 16c. The actuating surface 71c is arranged on a side of the connecting element 26c which is oriented at least essentially perpendicularly to the connecting axis 48c. The securing and/or guide unit 34c has a guide element 44c, which guides the connecting unit 24c when the wiper blade 14c moves relative to the wiper arm 18c. The guide element 44c is arranged on the wiper blade 14c and is formed in one piece with the wiper-blade adapter 16c. The guide element 44c is arranged on the securing elements 36c and a connection element 72c of the wiper-blade adapter 16c. The securing element 36c is provided so that it accommodates the connecting unit 24c at least to some extent when the two are brought into contact. The securing and/or guide unit 34c comprises a further guide element 52c, which is arranged on the connecting element 26c of the connecting unit 24c and is provided so that, in particular for a guided movement of the connecting unit 24c on the wiper blade 14c, it interacts with the guide element 44c. The further guide element 52c is designed in the form of a guide pin and extends from the connecting element 26c in a direction which is orientated at least essentially parallel to the connecting axis 48c. The connecting element 26c is mounted in a floating manner on the wiper-blade adapter 16c via the guide element 44c and the further guide element 52c. The further guide element 52c is designed in the form of a guide groove and extends on the wiper-blade adapter 16c at least to some extent along an axis of the wiper-blade adapter 16c which is oriented at least essentially parallel to a main-extent axis 50c of the wiper blade 14c. The guide element 44c and the further guide element 52c are designed such that, when the connecting element 26c and the connecting element 72c are connected, the further guide element 52c is enclosed at least for the most part over the entire length of the guide element 44c. The guide element 44c is preferably designed such that the movement of the further guide element 52c along the guide element 44c, in particular in a direction toward the connection element 72c, is limited. Other configurations of the connecting unit 24c, of the securing and/or guide unit 34c and of the wiper-blade adapter 16c are also conceivable. It is conceivable for the wiper arm 18c to comprise a covering cap 58c, which is arranged on the wiper-arm adapter 20c and is mounted in a movable manner on the wiper arm 18c, the covering cap 58c not being shown in FIGS. 6 and 7. The covering cap 58c is preferably provided so that it encloses the wiper-arm adapter 20c, the connecting unit 24c and the securing and/or guide unit 34c at least to some extent in at least one operating state.

What is claimed is:

1. A wiper arrangement comprising
at least one wiper blade (14c), which has at least one wiper-blade adapter (16c),
at least one connecting unit (24c) for connecting a fluid channel of a wiper arm fluidically to the wiper-blade adapter (16c), and
at least one securing and guide unit (34c), which has at least one first securing element (36c) which is configured to bring the connecting unit (24c) into contact with the at least one first securing element (36c) when the wiper blade (14c) moves relative to the wiper arm, wherein the securing and guide unit (34c) has a first guide element (44c) configured to guide the connecting unit (24c) when the wiper blade (14c) moves relative to the wiper arm;
wherein the connecting unit (24) includes two mating securing elements (70c) that each define a separate flexible latching arm, wherein each flexible latching arm is elongate and extends downwardly perpendicular to a longitudinal extent of the wiper blade, wherein the at least one first securing element (36c) includes two first securing elements (36c) that each define a separate rail, wherein distal ends the two flexible latching arms are configured to flex laterally outwardly and then laterally inwardly and latch underneath the two rails, and wherein the first guide element (44c) is a gap located between the two rails.

2. The wiper arrangement according to claim 1, characterized in that the two first securing elements (36c) are configured so that, when the wiper blade (14c) moves relative to the wiper arm, the two first securing elements (36c) subject the connecting unit (24c) to a force in at least one direction.

3. The wiper arrangement according to claim 1, characterized in that the first securing elements (36c) are configured so that, when the wiper blade (14c) moves relative to the wiper arm, the first securing elements (36c) secure the connecting unit (24c) in a position relative to the wiper arm or the wiper blade (14c).

4. The wiper arrangement according to claim 1, characterized in that the securing and guide unit (34c) has at least one further guide element (52c), which is arranged on the connecting unit (24c) and is configured to interact with the first guide element (44c) and/or the first securing elements (36c).

5. The wiper arrangement according to claim 1, characterized in that the first securing elements (36c) are arranged on the wiper blade (14c) and accommodate the connecting unit (24c) at least to some extent, or is accommodated by the connecting unit (24c) at least to some extent, when the first securing elements (36c) and the connecting unit (24c) are brought into contact.

6. The wiper arrangement according to claim 1, characterized in that the securing and guide unit (34c) has at least one actuating element (68c), which is configured so that the actuating element (68c) separates the connecting unit (24c) from the wiper blade (14c).

7. A wiper having at least one wiper arrangement (12c) according to claim 1.

8. The wiper arrangement according to claim 1, characterized in that the first securing elements (36c) are a mechanical stop.

9. The wiper arrangement according to claim 1, characterized in that the first securing elements (36c) are configured so that, when the wiper blade (14c) moves relative to the wiper arm, the first securing elements (36c) subject the connecting unit (24c) to a force in at least one direction at least essentially parallel to a movement direction (42c) of the wiper blade (14c) relative to the wiper arm.

10. The wiper arrangement according to claim 1, characterized in that the securing and guide unit (34c) has at least one further guide element (52c), which is arranged on the connecting unit (24c) and is configured so that, for a guided movement of the connecting unit (24c) on the wiper blade (14c), the at least one further guide element (52c) interacts with the first guide element (44c) and/or the first securing elements (36c).

11. The wiper arrangement according to claim 1, characterized in that the first securing elements (36c) are arranged on the wiper blade (14c), are formed in one piece with the wiper blade (14c), and accommodate the connecting unit (24c) at least to some extent, or are accommodated by the connecting unit (24c) at least to some extent, when the first securing elements (36c) and the connecting unit (24c) are brought into contact.

12. The wiper arrangement according to claim 1, characterized in that the securing and guide unit (34c) has at least one actuating element (68c), which is configured so that the at least one actuating element (68c) separates the connecting unit (24c) from the first securing elements (36c).

\* \* \* \* \*